US008938803B1

(12) United States Patent
Roberts et al.

(10) Patent No.: US 8,938,803 B1
(45) Date of Patent: Jan. 20, 2015

(54) DETECTING UNDESIRABLE COMPUTING ACTIVITY

(75) Inventors: Bradley D. Roberts, Bellevue, WA (US); Edwin S. Hong, Tacoma, WA (US); Andrew B. Dickinson, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 594 days.

(21) Appl. No.: 13/165,336

(22) Filed: Jun. 21, 2011

(51) Int. Cl.
*G06F 12/14* (2006.01)
*H04L 29/06* (2006.01)

(52) U.S. Cl.
CPC ............ *H04L 63/1408* (2013.01); *H04L 63/14* (2013.01)
USPC .................... 726/23; 726/20; 726/22; 726/24

(58) Field of Classification Search
None
See application file for complete search history.

(56) References Cited

U.S. PATENT DOCUMENTS

| | | | | |
|---|---|---|---|---|
| 7,610,344 B2* | 10/2009 | Mehr et al. | .................... | 709/206 |
| 7,970,832 B2* | 6/2011 | Perry et al. | .................... | 709/206 |
| 8,260,914 B1* | 9/2012 | Ranjan | .......................... | 709/224 |
| 8,566,928 B2* | 10/2013 | Dagon et al. | ..................... | 726/22 |
| 8,631,489 B2* | 1/2014 | Antonakakis et al. | .......... | 726/22 |
| 2008/0005312 A1* | 1/2008 | Boss et al. | .................... | 709/224 |
| 2008/0155694 A1* | 6/2008 | Kwon et al. | .................... | 726/23 |
| 2010/0281535 A1* | 11/2010 | Perry et al. | ....................... | 726/22 |
| 2011/0078309 A1* | 3/2011 | Bloch et al. | ................... | 709/224 |
| 2011/0283357 A1* | 11/2011 | Pandrangi et al. | .............. | 726/22 |

OTHER PUBLICATIONS

Bilge, L. "Exposure: Finding Malicious Domains Using Passive DNS Analysis" Institute Eurecom, Sophia Antipolis [online][retrieved on Jun. 21, 2011][retrieved from: http://www.iseclab.org/papers/bilge-ndss11.pdf] pp. 1-17.
Graham, P. "A Plan for Spam", Aug. 2002, [online] [retrieved on Jun. 21, 2011][retrieved from http://www.paulgraham.com/spam.html] pp. 1-10.

* cited by examiner

*Primary Examiner* — Kaveh Abrishamkar
(74) *Attorney, Agent, or Firm* — Lee & Hayes, PLLC (57) ABSTRACT

Instances executing within a programmable execution service ("PES") that are engaged in undesirable computing activity can be identified by comparing activity performed by instances executing within the PES to data describing known undesirable computing activity. Once compromised instances have been identified, other previously unknown undesirable computing activity performed by the compromised instances can be identified by determining whether activity is performed by the compromised instances significantly more often than other instances executing within the PES. New undesirable computing activity discovered using this process could then be utilized to discover other compromised instances.

17 Claims, 9 Drawing Sheets

DETECTING UNDESIRABLE COMPUTING ACTIVITY

BACKGROUND

A programmable execution service ("PES") provides computing resources for executing applications on a permanent or an as-needed basis. The computing resources provided by a PES may include various types of resources, such as data processing resources, data storage resources, data communication resources, and the like. Each type of computing resource may be general-purpose or may be available in a number of specific configurations. For example, data processing resources may be available as virtual machine instances ("instances"). The instances may be configured to execute applications, including World Wide Web ("Web") servers, application servers, media servers, database servers, and the like. Data storage resources may include file storage devices, block storage devices, and the like. The resources provided by a PES can typically be purchased by a customer of the PES and utilized according to various financial models.

Instances executing within a PES may be compromised in various ways. For instance, a malicious attacker might gain control over one or more instances executing within a PES by exploiting vulnerabilities within an operating system or application programs executing on the instances. Once the attacker has gained control over the instances, the attacker might configure the instances to engage in various types of undesirable computing activity. For example, the instances might be programmed to send unsolicited bulk electronic mail messages ("UBE" or "SPAM"), to perform distributed denial of service ("DDOS") attacks, to host undesirable World Wide Web ("Web") sites or other content, or to perform other types of undesirable computing activity. It can be difficult to detect instances executing in a PES that are performing this type of undesirable computing activity.

It is with respect to these and other considerations that the disclosure made herein is presented.

DETAILED DESCRIPTION

The following detailed description is directed to technologies for detecting undesirable computing activity. Utilizing the technologies described herein, instances executing within a PES that are performing undesirable computing activity (referred to herein as "compromised instances") can be identified by comparing computing activity performed by instances executing within the PES to various types of known undesirable computing activity.

Once compromised instances have been identified, previously unknown types of undesirable computing activity can be identified by determining whether certain computing activity is performed by the compromised instances significantly more often than the other instances executing within the PES. For instance, if compromised instances perform certain computing activity a statistically significant number of times more often than the other instances executing within the PES, this activity may be deemed undesirable computing activity. New undesirable computing activity discovered during this process can then be utilized to discover other compromised instances.

It should be appreciated that as few as one occurrence of undesirable computing activity might be considered significant. For instance, a compromised instance might perform only a single DNS lookup operation that has never been performed by other non-compromised instances. In this example, the single DNS lookup operation performed by the compromised instance might be considered significant.

According to one aspect disclosed herein, a PES platform is configured to provide instances of computing resources for executing an application. For example, the PES platform might provide virtual machine instances ("instances") for executing an application, such as an e-commerce application or another type of distributed application. Software components that implement the application are deployed to the virtual machine instances provided by the PES platform.

As discussed above, despite strong security measures implemented at the PES, it is possible for instances executing within the PES to become compromised. For instance, a malicious attacker might gain control over one or more instances executing within a PES by exploiting vulnerabilities within an operating system or application programs executing on the instances. In other cases, an attacker might utilize a fraudulently obtained credit card to purchase instances. Instances executing within the PES might also be compromised in other ways. It should be appreciated that the embodiments disclosed herein are not dependent upon the manner in which an instance is compromised.

Once an attacker has compromised one or more instances executing within the PES, the attacker may configure the instances to perform various types of undesirable computing activity. In order to combat this type of behavior, the PES platform disclosed herein is configured with functionality for detecting undesirable computing activity performed by instances executing within the PES.

As utilized herein, the term undesirable computing activity refers to activity performed by an instance within a PES or computing system that is deemed undesirable by the owner or operator of the instance, the PES, or the computing system. Undesirable computing activity might also include computing activity that is malicious, harmful to other computing systems, or unlawful. Examples of undesirable computing activity include, but are not limited to, sending UBE, performing DDOS attacks, hosting undesirable or offensive content or Web sites, cracking Completely Automated Public Turing test to tell Computers and Humans Apart ("CAPTCHA") codes, and performing functionality for allowing other instances or computers to engage in undesirable activity. It should be appreciated that there are many other types of undesirable computing activity that might be performed by instances executing within a PES and detected using the mechanisms disclosed herein.

As mentioned above, instances performing undesirable computing activity are referred to herein as "compromised instances." In general, instances, computers, and other types of computing systems described herein might be referred to as being compromised if the instances, computers, or other types of computing systems are performing undesirable computing activity.

According to one aspect disclosed herein, compromised instances are detected by comparing computing activity performed by instances executing within the PES to data describing known undesirable computing activity. For instance, in one embodiment, a log of activity performed by instances executing in the PES, such as DNS lookup operations, is created. The contents of the log are then compared to a database that identifies known undesirable computing activity, such as known undesirable domains, to identify instances as being compromised. In this example, an instance may be deemed to be compromised if it performs DNS lookup operations for one or more domains that are known to be undesirable.

Once compromised instances have been identified in the manner described above, a countermeasure or other type of activity might be performed in order to prevent further undesirable computing activity by the compromised instances. For example, communication to and from the compromised instances to undesirable domains might be restricted, all communication to and from the compromised instances may be restricted, the compromised instances may be terminated, monitoring of the instance might be increased, and/or a customer of the PES associated with the compromised instances might be notified. These actions might also be performed in combination.

In other embodiments, no countermeasure is taken with respect to a probably compromised instance. In these embodiments, a record might be made of the suspicious activity and/or additional monitoring of the instance might be performed. If the instance engages in additional suspicious activity in the future, then a countermeasure or other types of corrective action might be taken. Other types of countermeasures and activities might be performed in response to identifying one or more compromised instances within a PES.

Once compromised instances have been identified within the PES, other types of previously unknown undesirable computing activity might be discovered by monitoring the activity of the compromised instances and comparing the activity of the compromised instances to activity performed by other instances executing within the PES. For example, in one embodiment, new undesirable activity, such as DNS lookup operations for previously unknown undesirable domains, may be identified by logging the DNS lookup operations performed by the compromised instances. A statistical analysis can then be performed to identify activity that is performed by the compromised instances a significantly greater number of times than by the other instances executing within the PES. For instance, it might be determined that certain compromised instances perform DNS lookup operations for a particular domain a statistically significant number of times more frequently than other instances executing within the PES. In this case, the looked-up domain may be identified as an undesirable domain and added to a DNS block list database that identifies undesirable domains. In this way, the newly identified undesirable computing activity (i.e. the new undesirable domain) may be utilized to detect additional compromised instances.

It should be appreciated that although the examples given above have been described in the context of DNS lookup operations, other types of computing activity might be monitored, logged, and analyzed in order to identify undesirable computing activity. For instance, contacting undesirable network addresses and sending or receiving undesirable network messages might also be indicators of undesirable computing activity. These activities might also be correlated with other types of data in order to identify undesirable computing activity, such as the relative or absolute time at which the activity is performed, the frequency at which the activity is performed, and other factors.

It should also be appreciated that although the embodiments disclosed herein are described primarily in the context of instances executing within a PES, the embodiments described herein might also be utilized to detect undesirable computing activity on computing systems not executing virtual machine instances. Additional details regarding the various processes described above for identifying undesirable computing activity, and others, will be presented below with regard to FIGS. 1-9.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

Figure 1:
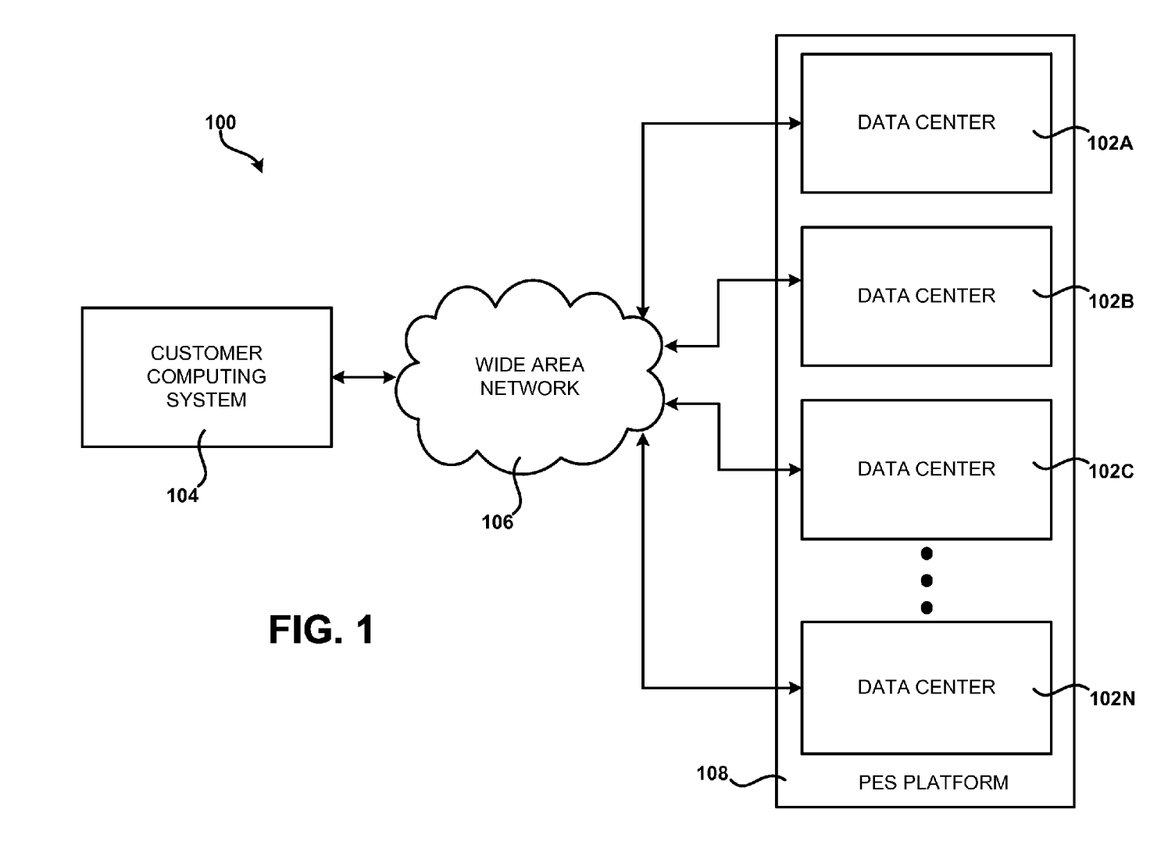
FIG. 1 is a system and network diagram showing aspects of one illustrative operating environment for the embodiments disclosed herein for detecting undesirable computing activity.

FIG. 1 and the following description are intended to provide a brief, general description of a suitable computing environment in which the embodiments described herein may be implemented. In particular, FIG. 1 is a system and network diagram that shows an illustrative operating environment 100 that includes a PES platform 108 for providing instances of computing resources.

As discussed briefly above, the PES platform 108 can provide computing resources for executing an application on a permanent or an as-needed basis. The computing resources provided by the PES platform 108 may include various types of resources, such as data processing resources, data storage resources, data communication resources, and the like. Each type of computing resource may be general-purpose or may be available in a number of specific configurations. For example, data processing resources may be available as virtual machine instances ("instances"). The instances may be configured to execute applications, including Web servers, application servers, media servers, database servers, and the like. Data storage resources may include file storage devices, block storage devices, and the like.

Each type or configuration of computing resource may be available in different sizes, such as large resources, consisting of many processors, large amounts of memory, and/or large storage capacity, and small resources consisting of fewer processors, smaller amounts of memory, and/or smaller storage capacity. Customers may choose to allocate a number of small processing resources as Web servers and/or one large processing resource as a database server, for example.

The computing resources provided by the PES platform 108 are enabled by one or more data centers 102A-102N (which may be referred herein singularly as "a data center 102" or in the plural as "the data centers 102"). The data centers 102 are facilities utilized to house and operate computer systems and associated components. The data centers 102 typically include redundant and backup power, communications, cooling, and security systems. The data centers 102 might also be located in geographically disparate locations. One illustrative configuration for a data center 102 that implements the concepts and technologies disclosed herein for detecting undesirable computing activity will be described below with regard to FIG. 2.

The customers and other consumers of the PES platform 108 may access the computing resources provided by the data centers 102 over a wide-area network ("WAN") 106. Although a WAN is illustrated in FIG. 1, it should be appreciated that a local-area network ("LAN"), the Internet, or any other networking topology known in the art that connects the data centers 102 to remote consumers may be utilized. It should also be appreciated that combinations of such networks might also be utilized.

The customer computing system 104 is a computer utilized by a customer or other consumer of the PES platform 108. For instance, the customer computing system 104 may be a server computer, a desktop or laptop personal computer, a tablet computer, a wireless telephone, a personal digital assistant ("PDA"), an e-reader, a game console, a set-top box, or any other computing device capable of accessing the PES platform 108.

The customer computing system 104 may be utilized to configure aspects of the computing resources provided by the PES platform 108. In this regard, the PES platform 108 might provide a Web interface through which aspects of its operation may be configured. For instances, a Web browser application program executing on the customer computing system 104 might be utilized to access the Web interface and configure the operation of the PES platform 108. Alternatively, a stand-alone application program executing on the customer computing system 104 might access an application programming interface ("API") exposed by the PES platform 108 for performing the configuration operations. Other mechanisms for configuring the operation of the PES platform 108, including deploying updates to an application, might also be utilized.

Figure 2:
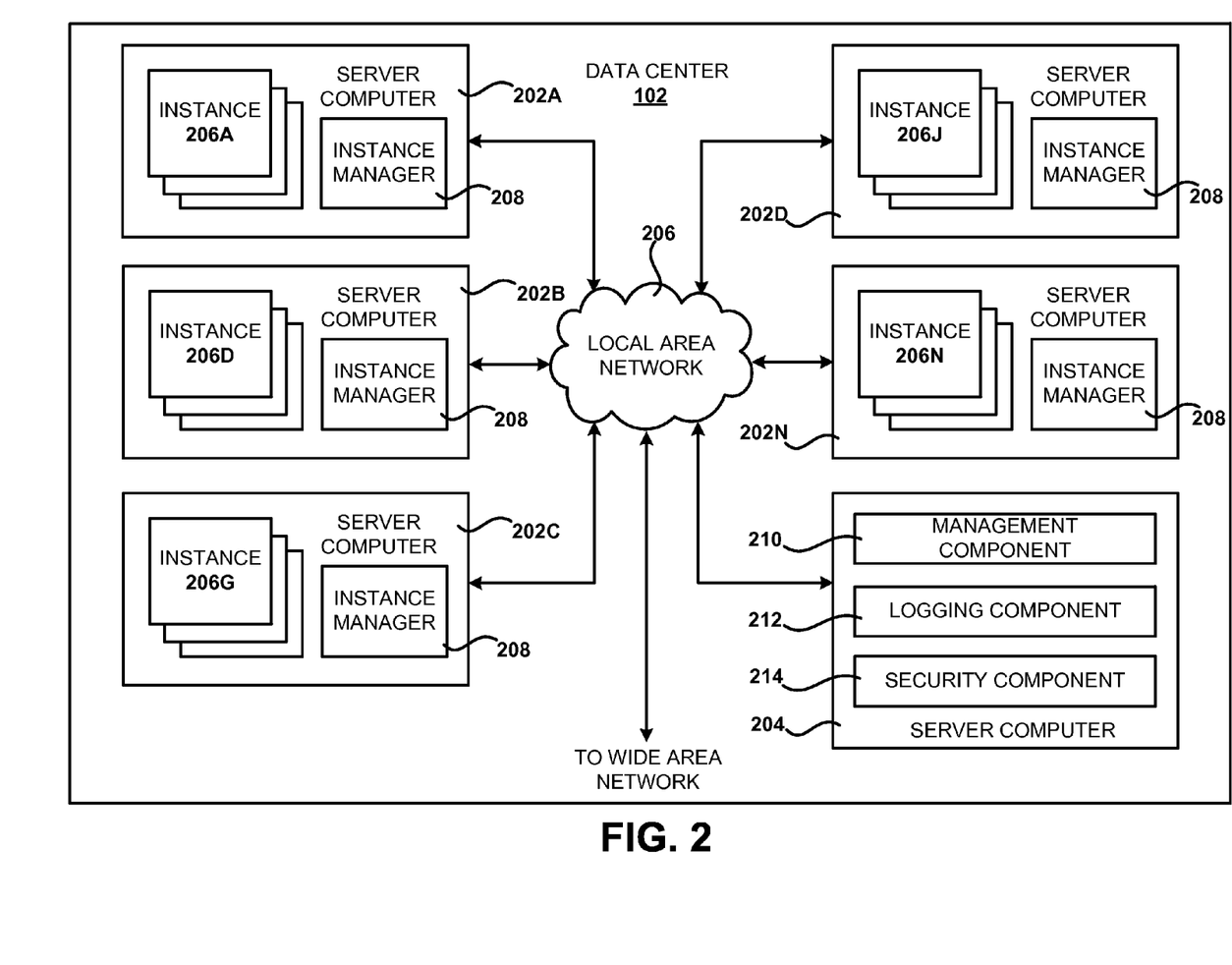
FIG. 2 is a computing system diagram that illustrates a configuration for a data center that implements the concepts and technologies disclosed herein for detecting undesirable computing activity, according to one embodiment.

FIG. 2 is a computing system diagram that illustrates one configuration for a data center 102 that implements a PES platform 108, including the concepts and technologies disclosed herein for detecting undesirable computing activity. The example data center 102 shown in FIG. 2 includes several server computers 202A-202N (which may be referred herein singularly as "a server computer 202" or in the plural as "the server computers 202") for providing computing resources for executing an application. The server computers 202 may be standard server computers configured appropriately for providing the computing resources described above. For instance, in one implementation the server computers 202 are configured to provide the instances 206A-206N.

In one embodiment, the instances 206A-206N (which may be referred herein singularly as "an instance 206" or in the plural as "the instances 206") are virtual machine instances. As known in the art, a virtual machine instance is an instance of a software implementation of a machine (i.e. a computer) that executes programs like a physical machine. In the example of virtual machine instances, each of the servers 202 may be configured to execute an instance manager 208 capable of executing the instances. The instance manager 208 might be a hypervisor or another type of program configured to enable the execution of multiple instances 206 on a single server 202, for example. As discussed above, each of the instances 206 may be configured to execute all or a portion of an application.

It should be appreciated that although the embodiments disclosed herein are described primarily in the context of virtual machine instances, other types of instances can be utilized with the concepts and technologies disclosed herein. For example, the technologies disclosed herein might be utilized with instances of storage resources, processing resources, data communications resources, and with other types of resources. As also discussed above, the embodiments disclosed herein might also be utilized with computing systems that do not utilize virtual machine instances.

The data center 102 shown in FIG. 2 also includes a server computer 204 reserved for executing software components for managing the operation of the data center 102, the server computers 202, and the instances 206. In particular, the server computer 204 might execute a management component 210. As discussed above, a customer of the PES platform 108 might utilize the customer computing system 104 to access the management component 210 to configure various aspects of the operation of PES platform 108 and the instances 206 purchased by the customer. For example, the customer may purchase instances and make changes to the configuration of the instances. The customer might also specify settings regarding how the purchased instances are to be scaled in response to demand.

In the example data center 102 shown in FIG. 2, an appropriate LAN 206 is utilized to interconnect the server computers 202A-202N and the server computer 204. The LAN 206 is also connected to the WAN 106 illustrated in FIG. 1. It should be appreciated that the network topology illustrated in FIGS. 1 and 2 has been greatly simplified and that many more networks and networking devices may be utilized to interconnect the various computing systems disclosed herein. Appropriate load balancing devices or software modules might also be utilized for balancing a load between each of the data centers 102A-102N, between each of the server computers 202A-202N in each data center 102, and between instances 206 purchased by each customer of the PES platform 108. These network topologies and devices should be apparent to those skilled in the art.

It should be appreciated that the data center 102 described in FIG. 2 is merely illustrative and that other implementations might be utilized. Additionally, it should be appreciated that the functionality disclosed herein might be implemented in software, hardware, or a combination of software and hardware. Other implementations should be apparent to those skilled in the art.

As illustrated in FIG. 2, the server computer 204 is also configured in one embodiment to execute a logging component 212 and a security component 214. The logging component 212 is configured to log various aspects of computing activity performed by the instances 206. For example, the logging component 212 might log DNS lookup operations (which might also be referred to herein as "DNS queries") performed by the instances 206 and incoming and outgoing network traffic to and from the instances 206. Although the logging component 212 is illustrated in FIG. 2 as executing on the server computer 204, it should be appreciated that all or a portion of the logging component 212 might be executed on the server computers 202 or other computer systems.

The security component 214 is configured to provide the functionality disclosed herein for detecting undesirable computing activity. As will be described in greater detail below, the security component 214 might utilize logs created by the logging component 212 to perform this functionality. The security component 214 might also utilize other databases and information not shown in FIG. 2 to perform the functionality disclosed herein. The security component 214 might also be executed completely, or in part, on the server computers 202 or on other computer systems. Additional details regarding the operation of the security component 214 will be provided below with regard to FIGS. 3-9.

Figure 3:
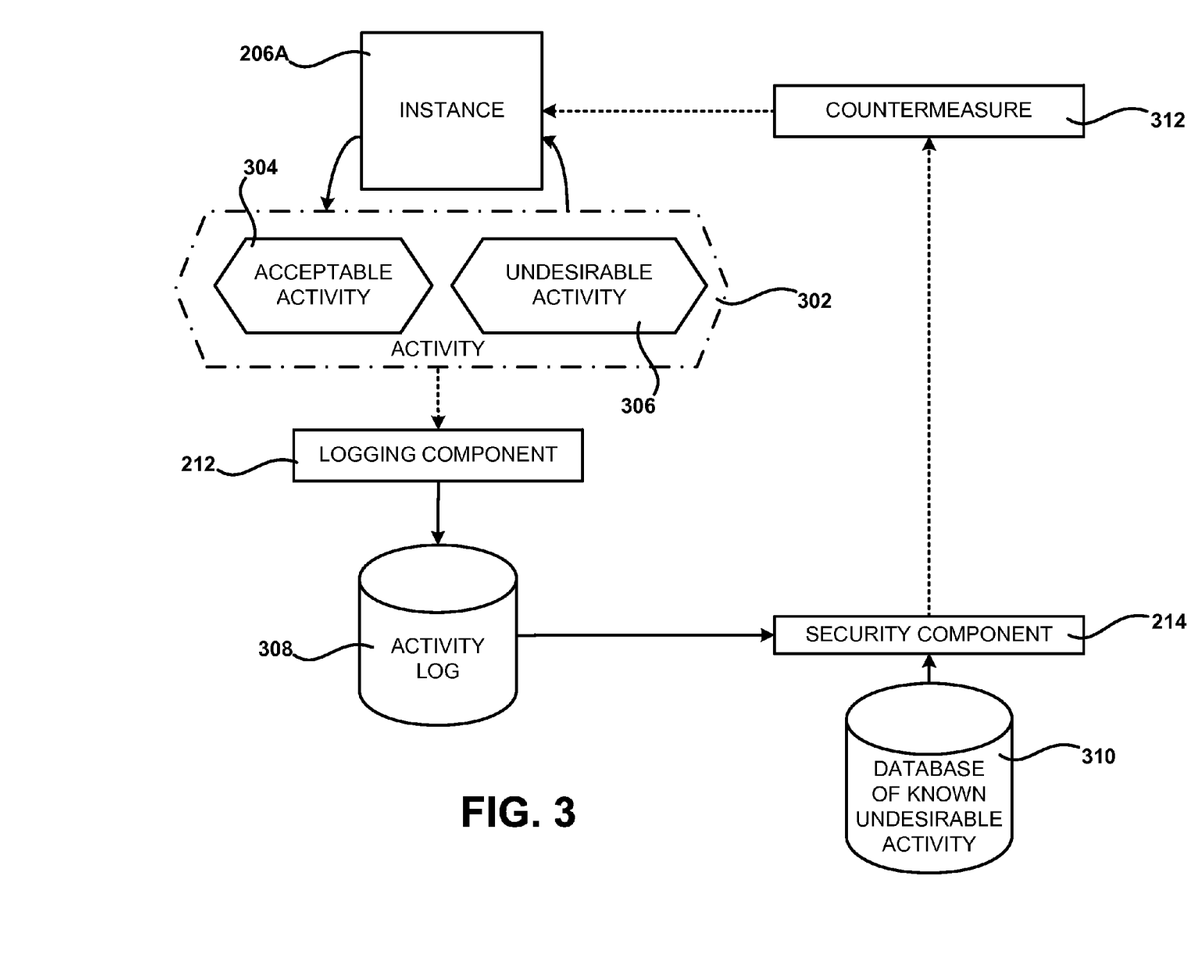
FIG. 3 is a computing system diagram that illustrates aspects of one methodology disclosed herein for detecting undesirable computing activity using data describing known undesirable computing activity, according to one embodiment.

FIG. 3 is a computing system diagram that illustrates aspects of one methodology disclosed herein for detecting undesirable computing activity using data describing known undesirable computing activity. In particular, in the example shown in FIG. 3, the security component 214 utilizes a database 310 of known undesirable computing activity in order to identify instances 206 that are engaged in undesirable computing activity. For example in the embodiment illustrated in FIG. 3, an instance 206A is engaged in activity 302. Some of the activity 302 may be acceptable activity 304, while other activity may be undesirable activity 306.

In order to identify the undesirable computing activity 306 performed by the instance 206A, the logging component 212 logs all or a portion of the activity 302 performed by the instance 206A to an activity log 308. For instance, as discussed briefly above, the logging component 212 might log DNS lookup operations performed by the instance 206A, incoming and outgoing network traffic to and from the instance 206A, and potentially other types of computing activity performed by the instance 206A. Data describing the activity 302 is stored in the activity log 308. It should be appreciated that although the terms "logging" and "log" have been utilized herein, many types of mechanisms and technologies known to those skilled in the art might be utilized to create and store a record of the activity of an instance. The terms "logging" and "log" are meant to encompass these other mechanisms.

As also described briefly above, the security component 214 is configured in one embodiment to utilize the data stored in the activity log 308 and the data stored in the database 310 of known undesirable activity to identify the undesirable activity 306 performed by the instance 206A. For instance, the security component 214 may compare activity identified in the activity log 308 to activity identified in the database 310 of known undesirable activity to identify the undesirable activity 306 performed by the instance 206A.

As an example, the activity log 308 might comprise a log of DNS lookup operations performed by the instance 206A in one embodiment. In this embodiment, the database of known undesirable activity 310 might comprise a DNS block list that identifies domains associated with undesirable computing activity. In this example, the security component 214 might determine that the instance 206A has performed DNS lookup operations for domains identified in the database 310. In response thereto, the security component 214 may deem this activity to be undesirable and consider the instance 206A to be a compromised instance. Details regarding one embodiment disclosed herein for utilizing DNS lookup operations to identify compromised instances, and to identify new undesirable domains will be described below with reference to FIGS. 6-8.

It should be appreciated that other mechanisms might also be utilized to identify an instance as being compromised. For instance, an indication might be received from a customer or another user that an instance has been compromised. In another embodiment, an "abuse report" or other type of report might be generated by a service within the PES or another component in response to activity performed by an instance or in response to a customer complaint. These indications might be utilized in order to conclude that an instance is a compromised instance. Other mechanisms might also be utilized.

Once an instance, such as the instance 206A, has been identified as a compromised instance, the security component 214 may cause one or more countermeasures 312 to be taken with respect to the compromised instance. For instance, as discussed above, the security component 214 might cause communication to and from the compromised instance to an undesirable domain to be restricted, may cause all communication to and from the compromised instance to be restricted, may terminate the compromised instance, or may notify a customer associated with the compromised instance, such as by sending an electronic mail message to a customer e-mail address associated with the instance indicating that the instance has been compromised. In order to terminate an instance, an appropriate instruction might be sent to an instance manager 208, which can halt the execution of the instance and persist the halted instance to storage. The security component 214 might take other types of countermeasures 312 or perform other types of activities with respect to a compromised instance 206.

Figure 4:
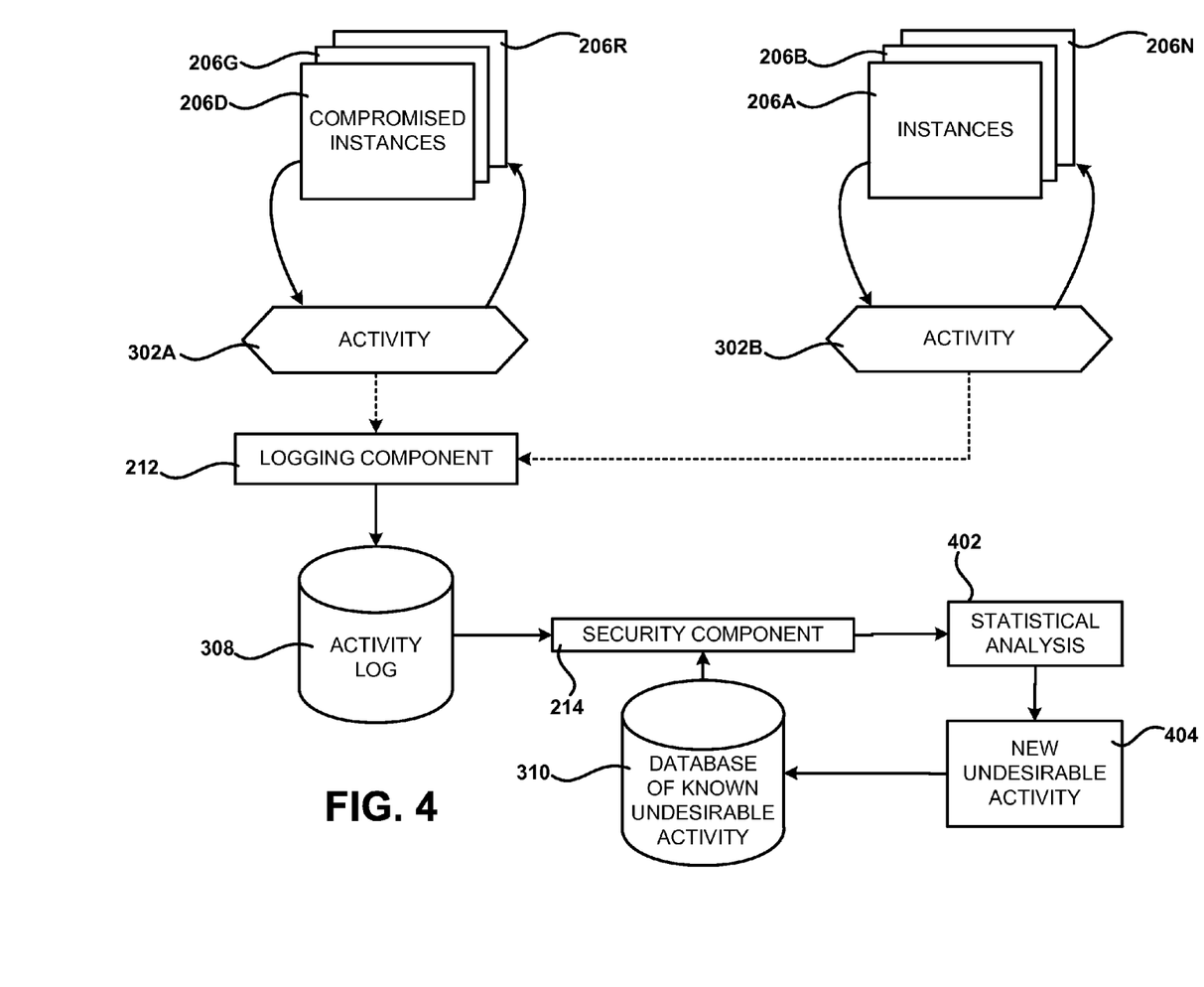
FIG. 4 is a computing system diagram that illustrates aspects of one methodology disclosed herein for detecting new types of undesirable computing activity, according to one embodiment disclosed herein.
Figure 5:
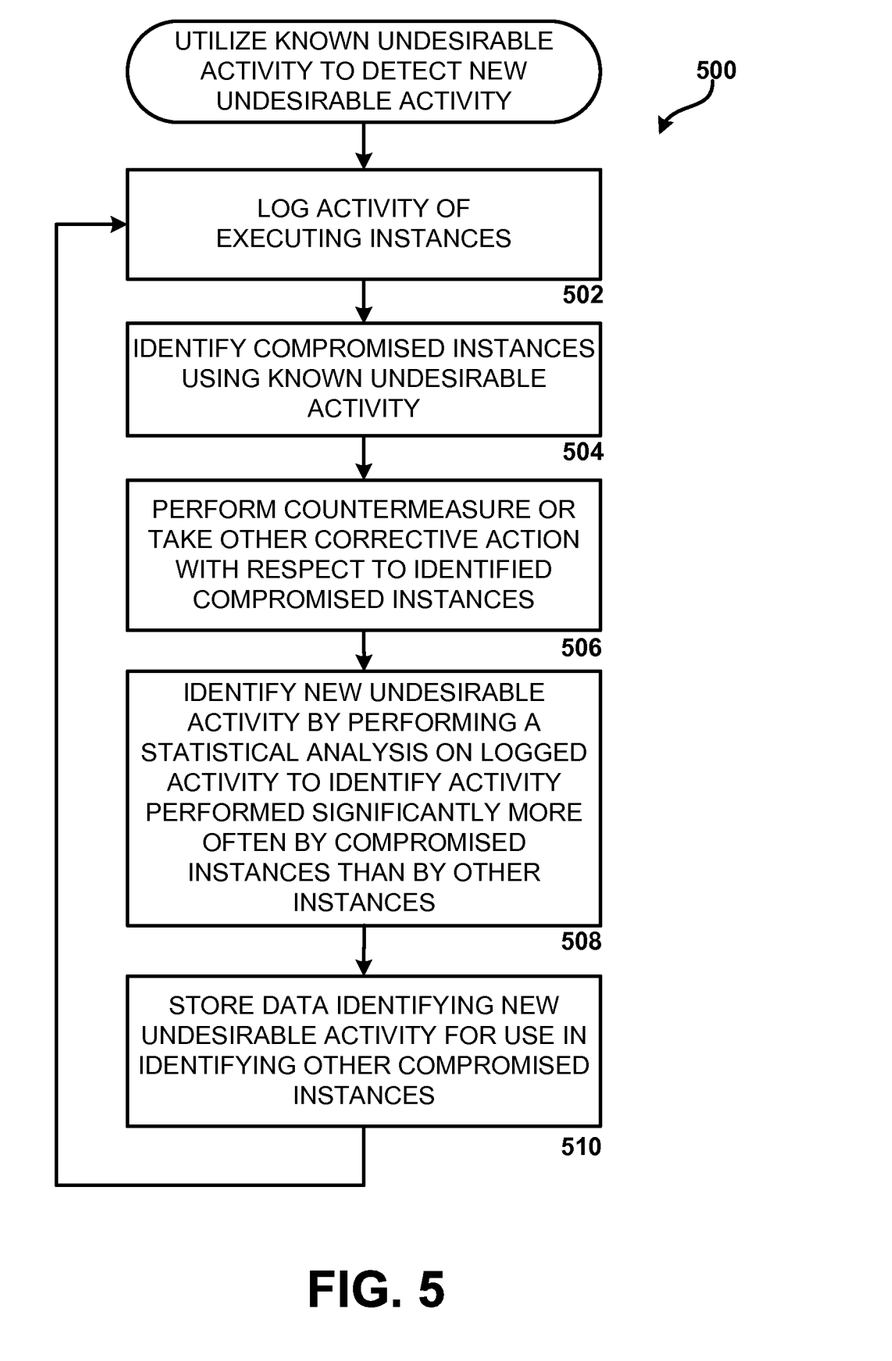
FIG. 5 is a flow diagram showing aspects of one routine disclosed herein that illustrates a process for detecting new types of undesirable computing activity, according to one embodiment disclosed herein.

Based on the description of FIG. 3 provided above, it should be appreciated that the security component 214 can identify undesirable activity 306 utilizing a database 310 of known undesirable activity. If, however, the undesirable activity 306 performed by the instance 206A is not identified in the database 310 of known undesirable activity, the security component 214 will be unable to identify the undesirable activity 306 utilizing the mechanism shown in FIG. 3. FIGS. 4 and 5, described below, illustrate one mechanism through which the security component 214 can identify new undesirable activity not identified in the database 310 of known undesirable activity.

FIG. 4 is a computing system diagram that illustrates aspects of one methodology disclosed herein for detecting new types of undesirable computing activity, according to one embodiment disclosed herein. In particular, FIG. 4 illustrates one example where the instances 206D, 206G, and 206R have been identified as compromised instances utilizing the mechanism described above with respect to FIG. 3. In this example, however, the security component 214 is configured to also identify new undesirable activity 404 that is not identified in the database 310 of known undesirable activity. In order to perform this functionality, the logging component 212 logs activity 302A performed by the compromised instances 206D, 206G, and 206R. The logging component 212 also logs activity 302B performed by all instances 206A-206N executing within the PES platform 108. The logged activity is stored in the activity log 308.

In one embodiment, for instance, the logging component 212 logs all DNS lookup operations performed by all instances 206A-206N executing within the PES platform 108 and stores data describing this activity in the activity log 308. Additional details regarding one embodiment for identifying new undesirable activity 404 utilizing DNS lookup operations will be provided below with respect to FIGS. 6-8.

In order to detect the new undesirable activity 404, the security component 214 is configured to perform a statistical analysis 402 on the activity 302A and 302B logged by the logging component 212. In particular, the statistical analysis 402 is configured to identify activity 302A that is performed by the compromised instances 206D, 206G, and 206R significantly more frequently than by all of the instances 206A-206N executing within the PES platform 108. In this regard, various thresholds may be set to specify the amount of activity 302A performed by the compromised instances 206D, 206G, and 206R must be greater than the activity 302B performed by all of the instances 206A-206N for the activity 302A to be considered new undesirable activity 404.

If the security component 214 identifies new undesirable activity 404 in the manner described above, the security component 214 is further configured to add the new undesirable activity 404 to the database 310 of known undesirable activity. The mechanism described above with regard to FIG. 3 might then be repeated in order to identify new compromised instances executing within the PES platform 108. It should be appreciated that this process may be continually iterated in order to identify new undesirable activity 404 and to identify new compromised instances within the PES platform 108. Additional details regarding this process will be provided below with respect to FIG. 5.

It should be appreciated that, as discussed above, the types of activity monitored by the logging component 212 and analyzed by the security component 214 may comprise virtually any type of computing activity performed by the instances 206A-206N. For instance, this activity might include DNS lookup operations, accessing certain undesirable network addresses, or sending or receiving network messages containing undesirable data. Other types of activity might also be monitored, logged, and analyzed in the manner described above to identify new instances of such undesirable activity.

Turning now to FIG. 5, additional details will be provided regarding one illustrative process disclosed herein for identifying undesirable computing activity. It should be appreciated that the logical operations described herein with respect to FIG. 5 and the other FIGURES are implemented (1) as a sequence of computer implemented acts or one or more program modules running on one or more computing systems and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 5 is a flow diagram showing aspects of one routine 500 disclosed herein that illustrates a process for detecting new types of undesirable computing activity, according to one embodiment disclosed herein. In one embodiment, the routine 500 and the other routines disclosed herein are performed by the security component 214. It will be appreciated that another module or component may also perform the routine 500 and the other routines disclosed herein, such as other modules and components executing on the server computer 204 or any of the server computers 202A-202N. A combination of modules and components might also perform the routine 500 and the other routines disclosed herein.

The routine 500 begins at operation 502, where the logging component 212 logs the activity of at least a portion of the instances 206A-206N executing within the PES 108. The routine 500 then proceeds to operation 504 where the security component 214 identifies compromised instances, such as the instances 206D, 206G, and 206R shown in FIG. 4, using the database 310 of known undesirable activity. One mechanism for performing this process was described above with regard to FIG. 3. As discussed above, when one or more compromised instances have been identified, the security component 214 may perform a countermeasure 312 or take other corrective or remedial action with respect to the identified compromised instances. This occurs at operation 506.

From operation 506, the routine 500 proceeds to operation 508 where the security component 214 identifies new undesirable activity 404 by performing the statistical analysis 402. As discussed above, the statistical analysis 402 compares the activity 302A performed by the compromised instances 206D, 206G, and 206R to activity 302B performed by the other instances 206A-206N executing within the PES 108. Through this analysis, the security component 214 can determine whether the activity 302A performed by the compromised instances was performed significantly more often than the activity 302B performed by the other instances 206A-206N. If activity 302A performed by the compromised instances 206D, 206G, or 206R was performed statistically more often than the activity 302B performed by the other instances 206A-206N, then the activity 302A may be designated as new undesirable activity 404.

From operation 508, the routine 500 proceeds to operation 510 where the security component 214 stores the new undesirable activity 404 in the database 310 of known undesirable activity. In this manner, the identified new undesirable activity 404 may be utilized to identify other compromised instances utilizing the mechanism described above with reference to FIG. 3. The routine 500 then proceeds from operation 510 to operation 502 where the above-described process may continue to identify new undesirable activity 404 and compromised instances.

Figure 6:
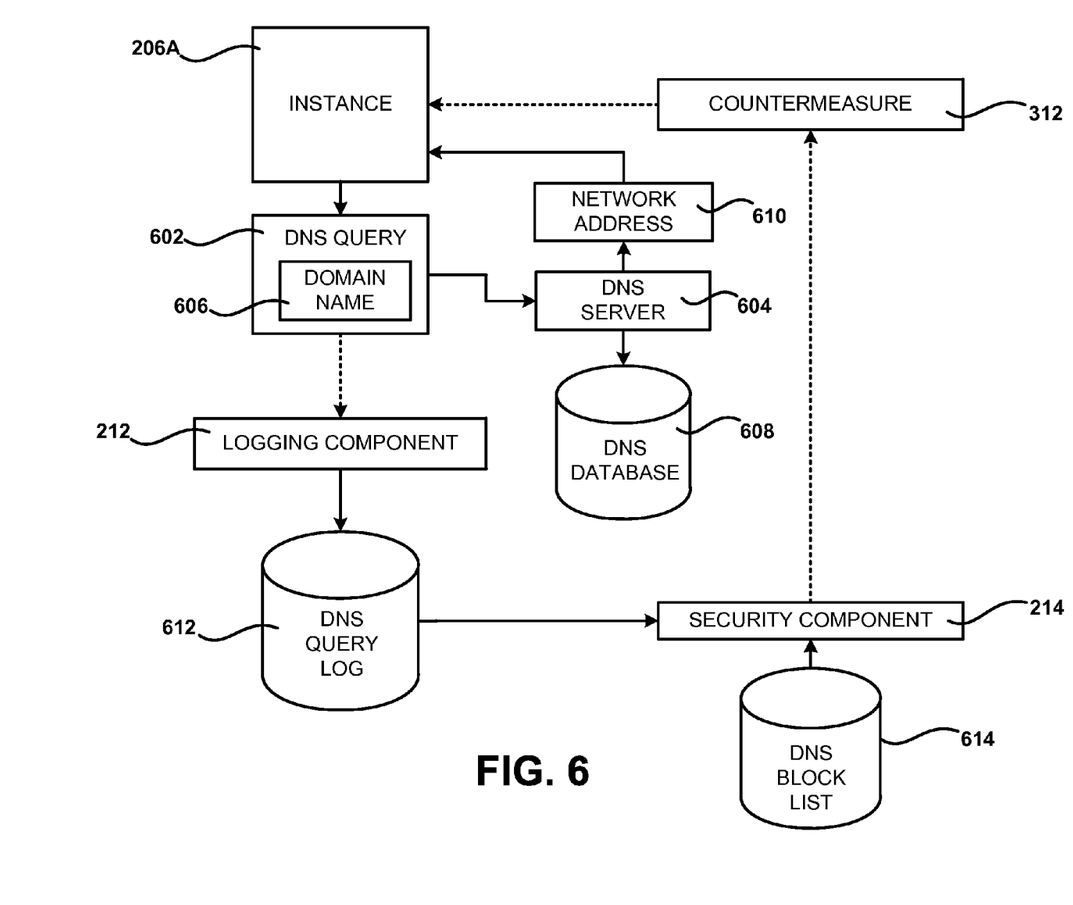
FIG. 6 is a computing system diagram that illustrates aspects of one methodology disclosed herein for detecting undesirable domains referenced in domain name service ("DNS") lookup operations using data describing known undesirable domains, according to one embodiment.

FIG. 6 is a computing system diagram that illustrates aspects of one methodology disclosed herein for detecting compromised instances using undesirable domains referenced in DNS lookup operations using data describing known undesirable domains, according to one embodiment. In particular, FIG. 6 shows one implementation of the general process described above with reference to FIGS. 3-5. In this implementation, DNS queries 602 made by instances are logged. For instance in the example shown in FIG. 6, the instance 206A has made a DNS query 602 for a domain name 606. The DNS query 602 is transmitted to a DNS server 604. In response thereto, the DNS server 604 consults a DNS database 608 to identify network address 610 associated with the domain name 606. The DNS server 604 then returns the identified network address 610 to the instance 206A in response to the DNS query 602.

The logging component 212 makes an entry in a DNS query log 612 for the DNS query 602 performed by the instance 206A. In order to determine whether the instance 206 is a compromised instance, the security component 214 compares the contents of the DNS query log 612 to data stored in a DNS block list 614. As known to those skilled in the art, the DNS block list 614 (which might also be referred to as a "DNS black list") is a list of domains that may be associated with undesirable computing activity and, therefore, should be blocked.

If the domain name 606 identified in the DNS query 602 is identified in the DNS block list 614, the security component 214 may conclude that the instance 206A is a compromised instance. In response thereto, the security component 214 may implement a countermeasure 312 with regard to the instance 206A. As discussed above, the countermeasure 312 may include restricting communication to the identified domain, restricting communication to and from the instance 206A, terminating the instance 206A, notifying a customer associated with the instance 206A, or performing other types of corrective or remedial actions.

Based on the description of FIG. 6 provided above, it should be appreciated that the mechanism described therein can be utilized to identify compromised instances by logging DNS queries 602 and comparing the contents of the logged DNS queries to data contained in the DNS block list 614. If an instance performs a DNS query 602 for a domain name 606 that is not identified in the DNS block list 614, however, the mechanism shown in FIG. 6 will not identify the instance as a compromised instance. The mechanism illustrated in FIG. 7 provides functionality for identifying compromised instances based on DNS queries that include domain names that are not identified in the DNS block list 614.

Figure 7:
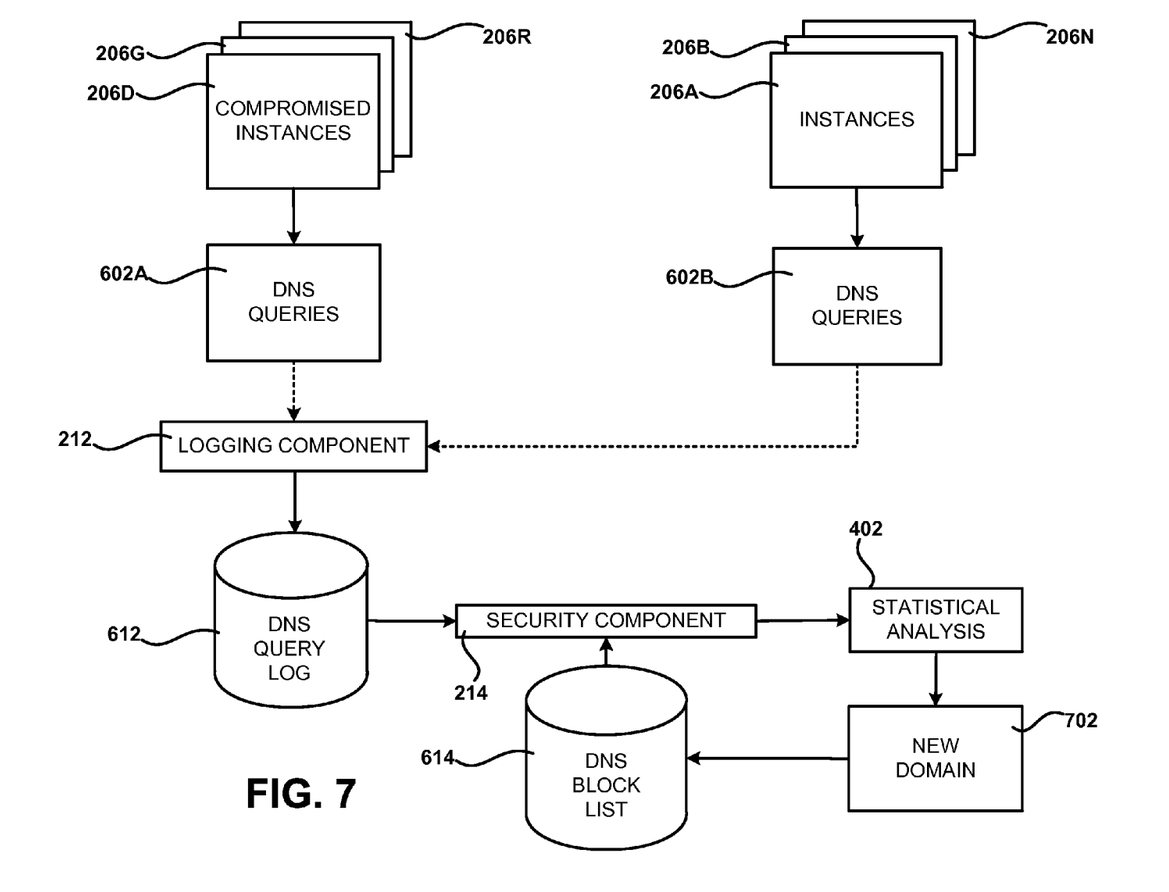
FIG. 7 is a computing system diagram that illustrates aspects of one methodology disclosed herein for detecting new undesirable domains referenced in DNS lookup operations, according to one embodiment disclosed herein.

FIG. 7 is a computing system diagram that illustrates aspects of one methodology disclosed herein for detecting new undesirable domains referenced in DNS lookup operations, according to one embodiment disclosed herein. In particular, in the example shown in FIG. 7, the instances 206D, 206G, and 206R have been identified as compromised instances. In this example, the logging component 212 logs DNS queries 602A made by the compromised instances 206D, 206G, and 206R and the DNS queries 602B made by the other instances 206A-206N executing in the PES platform 108. The logged DNS queries are stored in the DNS query log 612.

In this example, the security component 214 performs a statistical analysis 402 on the contents of the DNS query log 612 to identify undesirable domains not identified in the DNS block list 614. In particular, the statistical analysis 402 analyzes the DNS query log 612 to identify domains for which DNS queries 602A were performed by the compromised instances 206D, 206G, and 206R a significantly greater number of times than by the instances 206A-206N executing in the PES platform 108.

Any domains queried significantly more frequently by the compromised instances 206D, 206G, and 206R than by the other instances 206A-206N may be identified as new undesirable domains 702 and stored in the DNS block list 614. Additionally, the domains might also be flagged for further investigation to determine if the domains are actually undesirable or associated with undesirable computing activity in some manner. In this manner, the routine illustrated above and described with regard to FIG. 6 may be repeated to identify additional compromised instances utilizing the new undesirable domain 702 discovered utilizing the process shown in FIG. 7. The routine 800 described below illustrates this process in greater detail.

Figure 8:
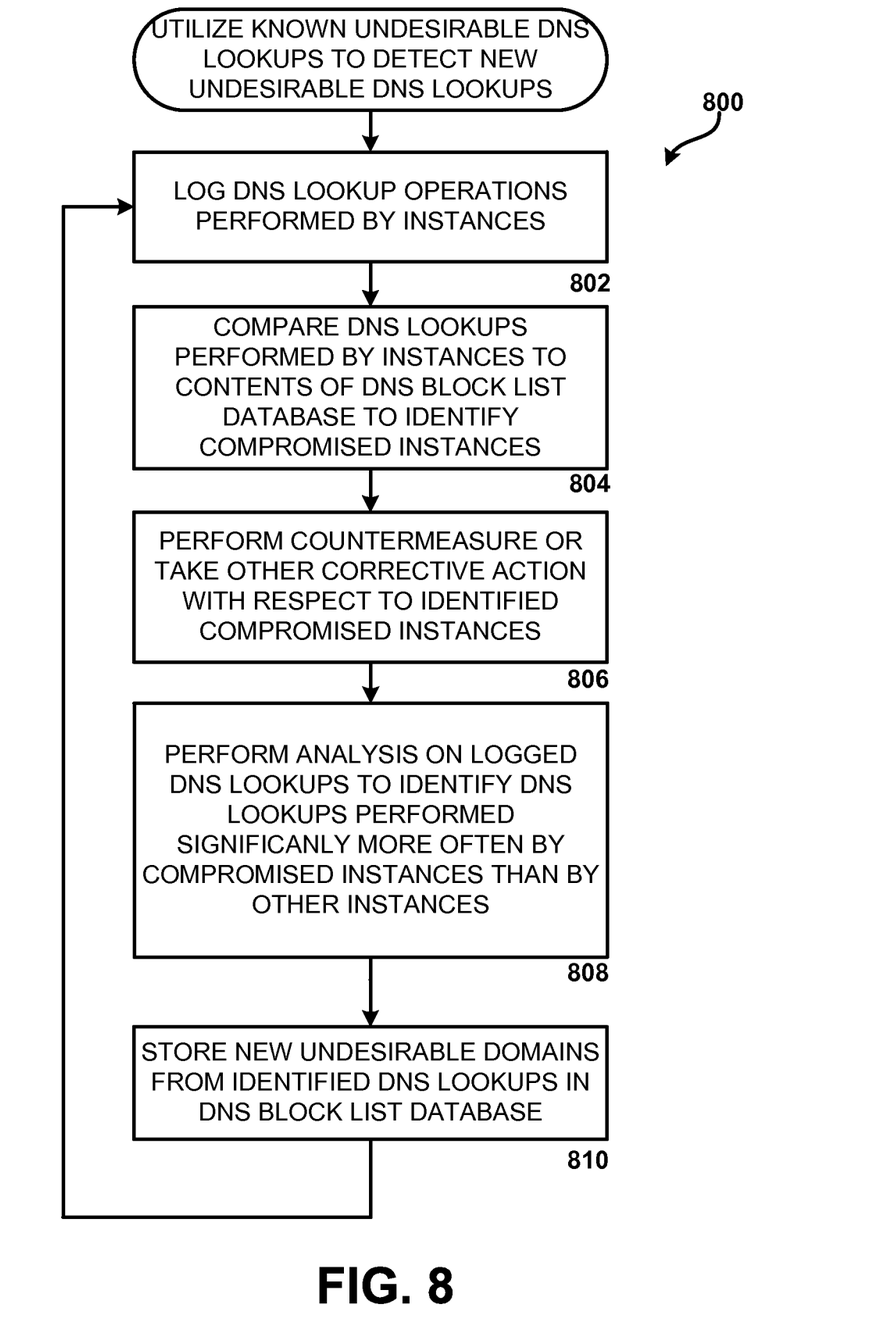
FIG. 8 is a flow diagram showing aspects of one routine disclosed herein that illustrates a process for detecting new undesirable domains referenced in DNS lookup operations, according to one embodiment disclosed herein.

FIG. 8 is a flow diagram showing aspects of one routine 800 disclosed herein that illustrates a process for detecting new undesirable domains, according to one embodiment disclosed herein. The routine 800 begins at operation 802, where the logging component 212 logs the DNS queries 602 performed by the other instances 206A-206N executing within the PES platform 108, including the compromised instances 206D, 206G, and 206R. As discussed above, the logging component 212 stores a log of the DNS queries 602 in the DNS query log 612. From operation 802, the routine 800 proceeds to operation 804.

At operation 804, the security component 214 compares the DNS queries 602 identified in the DNS query log 612 to the contents of the DNS block list 614. If any of the instances 206A-206N query domains that are identified in the DNS block list 614, the security component 214 identifies the instances as being compromised instances. For example, in the embodiment shown in FIG. 7, the instances 206D, 206G, and 206R have been identified as compromised instances utilizing this mechanism.

From operation 804, the routine 800 proceeds to operation 806 where the security component 214 performs a countermeasure 312 with regard to the compromised instances 206D, 206G, and 206R. The various types of countermeasures and other types of corrective action that may be taken with respect to identified compromised instances have been described above. From operation 806, the routine 800 proceeds to operation 808.

At operation 808, the security component 214 performs a statistical analysis 402 on the contents of the DNS query log 612. In particular, as mentioned above, the statistical analysis 402 identifies DNS queries 602A performed significantly more often by compromised instances 206D, 206G, 206R than by the other instances 206A-206N executing in the PES platform 108. The domains identified in the DNS queries 602A performed more frequently by the compromised instances 206D, 206G, and 206R may be identified as new undesirable domains and added to the DNS block list 614 at operation 810. The new undesirable domains 702 may then be utilized to identify additional compromised instances utilizing the mechanism described above with reference to FIG. 6. In this regard, the routine 800 proceeds from operation 810 to operation 802, described above, where additional undesirable domains may be identified in a similar manner.

It should be appreciated that while the embodiments described above were presented in the context of utilizing DNS queries to identify compromised instances and new undesirable domains, other types of activity performed by instances and executing in the PES platform 108 might also be utilized. For instance, as described briefly above, contact with undesirable network addresses or sending or receiving undesirable network messages might also be utilized to in a manner similar as to that described above to identify compromised instances and to discover previously unknown undesirable computing activity. In order to identify undesirable network messages, the messages might be processed in order to identify data patterns that are indicative of undesirable behavior. Other mechanisms might also be utilized.

Figure 9:
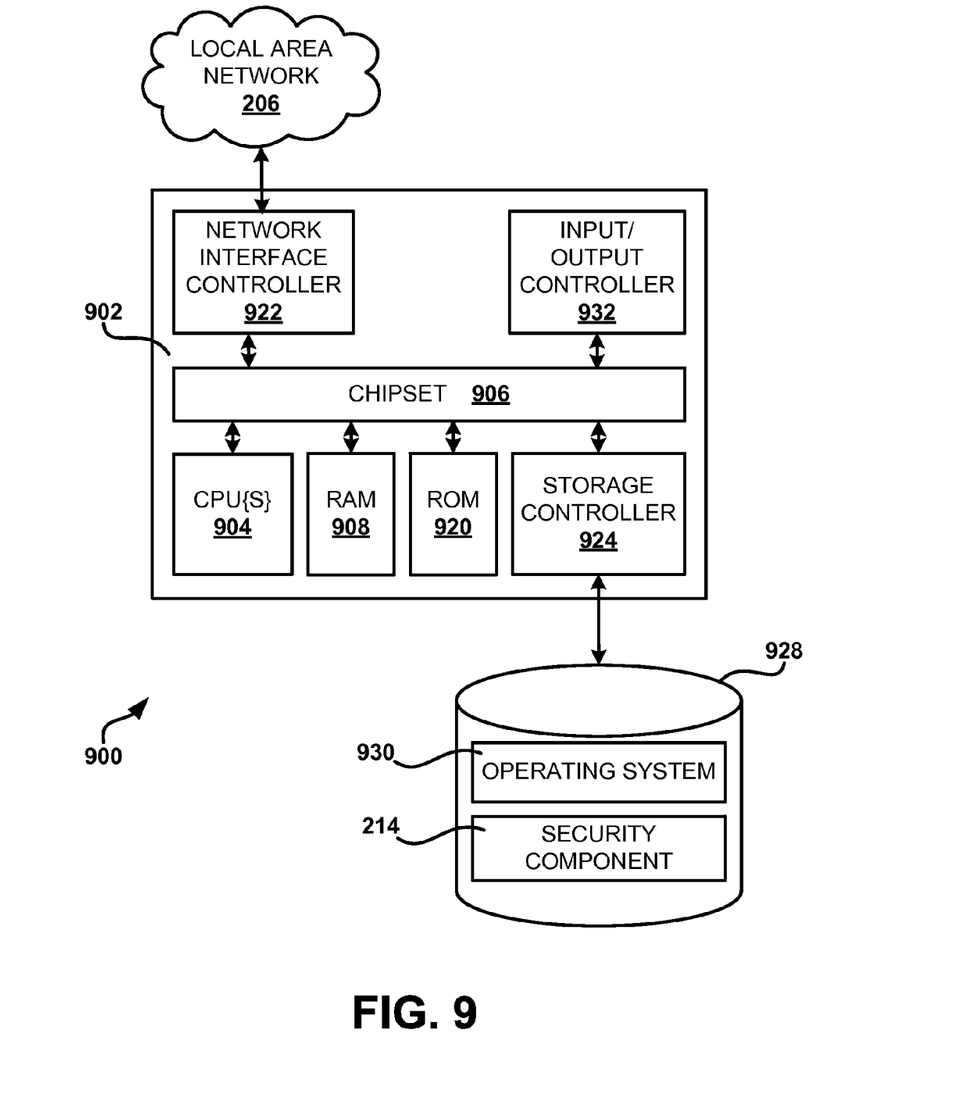
FIG. 9 is a computer architecture diagram showing one illustrative computer hardware architecture for implementing the various computing devices described in embodiments presented herein.

FIG. 9 shows an example computer architecture for a computer 900 capable of executing the software components described above. The computer architecture shown in FIG. 9 illustrates a conventional server computer, workstation, desktop computer, laptop, network appliance, personal digital assistant ("PDA"), e-reader, digital cellular phone, or other computing device, and may be utilized to execute any aspects of the software components presented herein described as executing within the data centers 102A-102N, on the server computers 202A-202N, on the customer computing system 104, or on any other computing system mentioned herein.

The computer 900 includes a baseboard, or "motherboard," which is a printed circuit board to which a multitude of components or devices may be connected by way of a system bus or other electrical communication paths. In one illustrative embodiment, one or more central processing units ("CPUs") 904 operate in conjunction with a chipset 906. The CPUs 904 are standard programmable processors that perform arithmetic and logical operations necessary for the operation of the computer 900.

The CPUs 904 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 906 provides an interface between the CPUs 904 and the remainder of the components and devices on the baseboard, such as a computer-readable storage media. For example, the chipset 906 may provide an interface to a computer-readable storage medium such as random access memory ("RAM") 908, used as the main memory in the computer 900. The chipset 906 may further provide an interface to a computer-readable storage medium such as a read-only memory ("ROM") 920 or non-volatile RAM ("NVRAM") for storing basic routines that that help to startup the computer 900 and to transfer information between the various components and devices. The ROM 920 or NVRAM may also store other software components necessary for the operation of the computer 900 in accordance with the embodiments described herein.

The computer 900 may operate in a networked environment using logical connections to remote computing devices and computer systems through the network 206. The chipset 906 may include functionality for providing network connectivity through a network interface controller ("NIC") 922, such as a gigabit Ethernet adapter. The NIC 922 is capable of connecting the computer 900 to other computing devices over the network 206. It should be appreciated that multiple NICs 922 may be present in the computer 900, connecting the computer to other types of networks and remote computer systems.

The computer 900 may be connected to a mass storage device 928 that provides non-volatile storage for the computer. The mass storage device 928 may store system programs, application programs, other program modules, and data, which have been described in greater detail herein. The mass storage device 928 may be connected to the computer 900 through a storage controller 924 connected to the chipset 906. The mass storage device 928 may consist of one or more physical storage units. The storage controller 924 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 may store data on the mass storage device 928 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 928 is characterized as primary or secondary storage, and the like.

For example, the computer 900 may store information to the mass storage device 928 by issuing instructions through the storage controller 924 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 may further read information from the mass storage device 928 by detecting the physical states or characteristics of one or more particular locations within the physical storage units.

In addition to the mass storage device 928 described above, the computer 900 may have access to other computer-readable storage media to store and retrieve information, such as program modules, data structures, or other data. It should be appreciated by those skilled in the art that computer-readable storage media can be any available article of manufacture that provides for the storage of non-transitory data and that may be accessed by the computer 900.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 928 may store an operating system 930 utilized to control the operation of the computer 900. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 928 may store other system or application programs and data utilized by the computer 900, such as the software components described above.

In one embodiment, the mass storage device 928 or other computer-readable storage media is encoded with computer-executable instructions which, when loaded into the computer 900, transforms the computer from a general-purpose computing system into a special-purpose computer capable of implementing the embodiments described herein. These computer-executable instructions transform the computer 900 by specifying how the CPUs 904 transition between states, as described above. According to one embodiment, the computer 900 has access to computer-readable storage media storing computer-executable instructions which, when executed by the computer 900, perform the routines 500 and 800, described above with regard to FIGS. 5 and 8, respectively.

The computer 900 may also include an input/output controller 932 for receiving and processing input from a number of input devices, such as a keyboard, a mouse, a touchpad, a touch screen, an electronic stylus, or other type of input device. Similarly, the input/output controller 932 may provide output to a display, such as a computer monitor, a flat-panel display, a digital projector, a printer, a plotter, or other type of output device. It will be appreciated that the computer 900 may not include all of the components shown in FIG. 9, may include other components that are not explicitly shown in FIG. 9, or may utilize an architecture completely different than that shown in FIG. 9.

Based on the foregoing, it should be appreciated that technologies for detecting undesirable computing activity have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for detecting undesirable domains, the method comprising executing instructions on one or more computers for:
   generating a log of domain name service (DNS) lookup operations performed by a plurality of instances executing in a programmable execution service (PES);
   comparing domains identified in the log to a list of known undesirable domains to identify one or more of the instances executing in the PES as compromised instances; and
   identifying one or more new undesirable domains by comparing DNS lookup operations performed by the compromised instances with DNS lookup operations performed by the plurality of instances executing in the PES, wherein the one or more new undesirable domains are identified to be one or more of the domains for which DNS lookup operations were performed by the compromised instances a significantly greater number of times than by the plurality of instances executing in the PES.

2. The computer-implemented method of claim 1, further comprising adding the identified one or more new undesirable domains to the list of known undesirable domains.

3. The computer-implemented method of claim 1, further comprising utilizing the one or more new undesirable domains to identify one or more additional compromised instances executing in the PES.

4. The computer-implemented method of claim 1, further comprising restricting communication with the undesirable domains by the compromised instances in response to identifying one or more of the instances executing in the PES as compromised instances.

5. The computer-implemented method of claim 1, further comprising restricting communication to and from the compromised instances in response to identifying one or more of the instances executing in the PES as compromised instances.

6. The computer-implemented method of claim 1, further comprising terminating the compromised instances in response to identifying one or more of the instances executing in the PES as compromised instances.

7. The computer-implemented method of claim 1, further comprising notifying a customer associated with the compromised instances in response to identifying one or more of the instances executing in the PES as compromised instances.

8. A non-transitory computer-readable storage medium having computer-executable instructions stored thereupon which, when executed by a computer, cause the computer to:
   generate a log of activity performed by a plurality of instances executing in a programmable execution service (PES);
   comparing activity in the log to known undesirable activity to identify one or more of the instances executing in the PES as compromised instances; and
   identifying new undesirable activity by comparing activity performed by the compromised instances with activity performed by the plurality of instances executing in the PES, comprising performing a statistical analysis on the activity performed by the plurality of instances executing in the PES to identify activity performed by the compromised instances a significantly greater number of times than by the plurality of instances executing in the PES, wherein the identified activity comprises the new undesirable activity.

9. The computer-readable storage medium of claim 8, further comprising adding the new undesirable activity to the known undesirable activity.

10. The computer-readable storage medium of claim 8, wherein the undesirable activity comprises performing DNS lookup operations for undesirable domains.

11. The computer-readable storage medium of claim 8, wherein the undesirable activity comprises contacting undesirable network addresses.

12. The computer-readable storage medium of claim 8, wherein the undesirable activity comprises sending or receiving undesirable network messages.

13. A computing system capable of detecting undesirable computing activity, the computing system comprising:
   at least one computer configured to execute a security component, the security component configured to compare activity performed by a plurality of computing systems to known undesirable activity to identify one or more of the computing systems as being compromised computing systems, and to identify new undesirable activity by comparing activity performed by the compromised computing systems with activity performed by the plurality of computing systems, wherein identifying the new undesirable activity comprises performing a statistical analysis on the activity performed by the plurality of computing systems to identify activity performed by the compromised computing systems a significantly greater number of times than by the plurality of computing systems, and wherein the identified activity comprises the new undesirable activity.

14. The computing system of claim 13, wherein the security component is further configured to add the new undesirable activity to the known undesirable activity to identify additional compromised computing systems.

15. The computing system of claim 13, wherein one or more of the computing systems are identified as being compromised computing systems in response to receiving a report.

16. The computing system of claim 13, wherein the undesirable activity comprises performing DNS lookup operations for undesirable domains.

17. The computing system of claim 13, wherein the undesirable activity comprises one or more of contacting undesirable network addresses or sending or receiving undesirable network messages.

\* \* \* \* \*